US010645557B2

(12) United States Patent
Robison et al.

(10) Patent No.: US 10,645,557 B2
(45) Date of Patent: May 5, 2020

(54) TRANSFERABLE OWNERSHIP TOKENS FOR DISCRETE, IDENTIFIABLE DEVICES

(71) Applicant: Dell Products L.P., Round Rock, TX (US)

(72) Inventors: Charles D. Robison, Buford, GA (US); Daniel L. Hamlin, Round Rock, TX (US); Warren Wade Robbins, Celina, TX (US)

(73) Assignee: Dell Products L.P., Round Rock, TX (US)

( * ) Notice: Subject to any disclaimer, the term of this patent is extended or adjusted under 35 U.S.C. 154(b) by 367 days.

(21) Appl. No.: 15/479,125

(22) Filed: Apr. 4, 2017

(65) Prior Publication Data

US 2018/0288617 A1    Oct. 4, 2018

(51) Int. Cl.
*H04W 4/80* (2018.01)
*H04L 29/08* (2006.01)
*H04L 29/06* (2006.01)

(52) U.S. Cl.
CPC .............. *H04W 4/80* (2018.02); *H04L 63/08* (2013.01); *H04L 67/12* (2013.01); *H04L 2463/082* (2013.01)

(58) Field of Classification Search
CPC ......... H04W 12/00; H04W 8/20; H04W 8/02; H04L 63/06; H04L 63/08; H04L 67/12; H04L 2463/082; H04L 2463/101–103
USPC .................................................. 726/7, 5, 20
See application file for complete search history.

(56) References Cited

U.S. PATENT DOCUMENTS

| 9,177,313 | B1 * | 11/2015 | Silverman | G06Q 20/367 |
| 9,935,950 | B2 * | 4/2018 | Yacoub | H04L 63/0876 |
| 10,009,359 | B2 * | 6/2018 | Smith | H04L 63/06 |
| 10,402,815 | B2 * | 9/2019 | Sharma | G06Q 20/3276 |
| 10,480,216 | B2 * | 11/2019 | Lim | G06K 7/10297 |

(Continued)

OTHER PUBLICATIONS

Chen et al., Anti-counterfeit Ownership Transfer Protocol for Low Cost RFID System, WSEAS Transactions on Computers (from google scholar) (Year: 2008).*

(Continued)

*Primary Examiner* — Kambiz Zand
*Assistant Examiner* — Mahabub S Ahmed
(74) *Attorney, Agent, or Firm* — Jackson Walker L.L.P.

(57) ABSTRACT

A mobile device that includes an ownership token application program receives user input indicative of a first authentication factor associated with an ownership token bound to an Internet of Things (IoT) device. Responsive to detecting the IoT device in close proximity, the mobile device may obtain a second authentication factor and an IoT device identifier from the IoT device. The mobile device may then provide the obtained factors as authenticating credentials to a token server via a trust application program interface (API). After the server authenticates the mobile device, the server may send the token to the mobile device thereby transferring ownership rights, including access rights, to recipient. The application program and/or the trust API may be configured for one-time access wherein, after the token has been transferred to the mobile device. The discrete electronic device may comprise an Internet of Things (IoT device) that supports wireless, near field communication.

20 Claims, 3 Drawing Sheets

(56) References Cited

U.S. PATENT DOCUMENTS

| | | | |
|---|---|---|---|
| 2002/0029183 A1* | 3/2002 | Vlahoplus | G06Q 30/06 705/37 |
| 2002/0169640 A1* | 11/2002 | Freeland | G06Q 30/06 705/4 |
| 2005/0187871 A1* | 8/2005 | Yeung | G06Q 10/00 705/39 |
| 2005/0257055 A1* | 11/2005 | Anderson | H04L 63/0442 713/170 |
| 2007/0179978 A1* | 8/2007 | Lee | H04L 63/08 |
| 2009/0183241 A1* | 7/2009 | Anderson | H04L 63/0442 726/4 |
| 2013/0227653 A1* | 8/2013 | Choi | H04L 67/02 726/4 |
| 2014/0344153 A1* | 11/2014 | Raj | G06Q 20/3223 705/44 |
| 2015/0106616 A1* | 4/2015 | Nix | H04L 9/3247 713/156 |
| 2015/0113172 A1* | 4/2015 | Johnson | G06Q 10/10 709/245 |
| 2015/0113592 A1* | 4/2015 | Curtis | H04L 63/0823 726/2 |
| 2015/0113599 A1* | 4/2015 | Curtis | H04L 63/0428 726/4 |
| 2015/0134954 A1* | 5/2015 | Walley | H04L 63/08 713/168 |
| 2015/0312041 A1* | 10/2015 | Choi | H04L 9/3231 713/175 |
| 2016/0072808 A1* | 3/2016 | David | H04L 9/3268 713/158 |
| 2016/0087933 A1* | 3/2016 | Johnson | H04W 4/70 709/245 |
| 2016/0105501 A1* | 4/2016 | Choi | H04W 4/70 709/225 |
| 2016/0112262 A1* | 4/2016 | Johnson | G06F 9/45504 709/221 |
| 2016/0128016 A1* | 5/2016 | Avary | H04W 12/02 455/517 |
| 2016/0205097 A1* | 7/2016 | Yacoub | H04L 63/0876 726/6 |
| 2016/0323257 A1* | 11/2016 | Kang | H04L 63/08 |
| 2016/0344740 A1* | 11/2016 | Choi | H04L 63/102 |
| 2016/0358186 A1* | 12/2016 | Radocchia | H04W 4/70 |
| 2016/0364787 A1* | 12/2016 | Walker | H04L 9/3247 |
| 2016/0366157 A1* | 12/2016 | Smith | H04L 63/06 |
| 2017/0169363 A1* | 6/2017 | Salmasi | H04W 4/21 |
| 2017/0178072 A1* | 6/2017 | Poornachandran | H04W 12/10 |
| 2017/0180132 A1* | 6/2017 | Osborne | H04L 9/3247 |
| 2017/0206532 A1* | 7/2017 | Choi | H04L 67/02 |
| 2017/0330199 A1* | 11/2017 | Klimt | G06Q 30/0185 |
| 2017/0346848 A1* | 11/2017 | Smith | H04W 4/70 |
| 2017/0364908 A1* | 12/2017 | Smith | G06Q 20/023 |
| 2018/0018723 A1* | 1/2018 | Nagla | G06Q 20/4014 |
| 2018/0041930 A1* | 2/2018 | Hampel | H04L 63/06 |
| 2018/0047032 A1* | 2/2018 | Wu | G06K 7/10366 |
| 2018/0077449 A1* | 3/2018 | Herz | H04W 4/38 |
| 2018/0082289 A1* | 3/2018 | Johnson | G06Q 20/3829 |
| 2018/0160252 A1* | 6/2018 | Olive | H04W 8/205 |
| 2018/0173896 A1* | 6/2018 | Arneson | G06F 21/44 |
| 2018/0270064 A1* | 9/2018 | Gehrmann | H04W 4/70 |
| 2018/0287780 A1* | 10/2018 | Safford | G06F 21/577 |
| 2018/0310152 A1* | 10/2018 | Huynh | H04B 5/0031 |

OTHER PUBLICATIONS

Song et al., Scalable RFID security protocols supporting tag ownership transfer, Elsevier (Year: 2010).*

* cited by examiner

TRANSFERABLE OWNERSHIP TOKENS FOR DISCRETE, IDENTIFIABLE DEVICES

TECHNICAL FIELD

Disclosed subject matter is in the field of mobile, network-aware sensors and other data recording/reporting devices commonly referred to as Internet of Things (IoT) devices and, more specifically, mechanisms for preventing unauthorized access of such devices.

BACKGROUND

As the value and use of information continues to increase, individuals and businesses seek additional ways to process and store information. Information handling systems represent one option available to users. An information handling system generally processes, compiles, stores, and/or communicates information or data for business, personal, or other purposes thereby allowing users to take advantage of the value of the information.

Because information handling needs and requirements vary between different users or applications, information handling systems may also vary regarding what information is handled, how the information is handled, how much information is processed, stored, or communicated, and how quickly and efficiently the information may be processed, stored, or communicated. Variations in information handling systems allow for information handling systems to be general or configured for a specific user or specific use such as financial transaction processing, airline reservations, enterprise data storage, or global communications. Information handling systems may also include a variety of hardware and software components that may be configured to process, store, and communicate information and may include one or more computer systems, data storage systems, and networking systems.

IoT devices are an emerging class of information handling resources, encompassing dynamically configurable objects with embedded technologies capable of communicating over public and private networks, and capable of bidirectional interactions with the environment individually or as organized systems. See, e.g., Dell, Inc., *Massively Connected—The Evolving Internet of Things and Pervasive Computing Ecosystems*, pp. 2-3, (Dell Software, 2014) (hereinafter "Massively Connected"), which is incorporated by reference herein in its entirety.

An array of technological and social advances are contributing to IoT growth. The launch of IPv6 in June of 2012 enabled billions of new devices to connect to the Internet, each with their own individual address designation. Mobile access and high-speed wireless connectivity have become ubiquitous, extending to ever-more remote locations. Smaller, cheaper, and better performing sensors and smart controllers can efficiently acquire data from the physical environment to help optimize operations and increase productivity. In addition, people are becoming increasingly comfortable using technology both at home and at work or school and the cost of deploying sophisticated personal technologies is falling steeply even as improvements to attributes such as battery life and functionality accelerate. Finally, high performance and cloud computing combined with powerful new tools for data analysis and software-defined infrastructure reap the benefits of and provide justification for networks comprising millions or billions of devices capturing unprecedented volumes of data.

Despite their potential as the cornerstone of a revolutionizing technological and informational paradigm, IoT devices have been leveraged in malicious efforts including multiple significant distributed denial of service (DDOS) attacks. The use of default access credentials is one characteristic of many common first-generation IoT devices including home routers and online cameras that has contributed to the success and extent of IoT-based DDOS attacks.

SUMMARY

In accordance with the teachings of the present disclosure, disadvantages and problems associated with securing IoT devices may be reduced or eliminated.

As indicated in the background description above, certain common IoT devices may be distributed or deployed with a reset mechanism that restores or establishes login credentials to default values. Not infrequently, such default values are publically known or easily obtainable or easily guessed using a relatively small number of candidates. Modifying default credentials, however, may be cumbersome and may require unique device interaction, such as plugging the device to a segregated network to perform network detection and modification of settings. As a result, many such devices may be deployed with default access credentials, making them susceptible to unauthorized users. The Mirai botnet responsible for multiple well-publicized DDOS attacks is an example of malware that gains access to IoT devices, including home routers, remote cameras, and other consumer devices, by guessing from a small pool of candidate user identification (userID) and passwords. The existence of an enormous and ever-increasing number of easily-accessed IoT devices has resulted in DDOS attacks of unprecedented scope and magnitude.

In accordance with disclosed subject matter, an ownership token server includes a processor, a network interface, and a computer readable medium including processor executable instructions for performing operations including obtaining a first authentication factor, a second authentication factor, and a device identifier uniquely identifying a discrete electronic device. An ownership token is generated based on the first and second authentication factors and the discrete electronic device identifier. The ownership token may be bound to the discrete electronic device and used to prevent, unauthorized access to the discrete electronic device including the discrete electronic device's configuration settings and input/output (I/O) resources.

Responsive to receiving a request to access the ownership token and authenticating the request in accordance with the first and second authentication factors and the discrete electronic device identifier, transferring the ownership token to the mobile device. The discrete electronic device may be an IoT that includes an embedded controller, a wireless transceiver capable of near field communication, and non-volatile storage sufficient to store a device identifier. After transferring the ownership token, the server may destroy all copies of the ownership token at the request of the buyer or maintain a resident copy of the ownership token after said transferring. The operations may further include configuring the IoT device to respond to detecting the mobile device in close proximity and receiving the first authentication factor from the mobile device by providing the second authentication factor and the discrete electronic device identifier to the mobile device via near filed communication or another suitable short range wireless communication.

In accordance with additional disclosed subject matter, an ownership token application program (app) of a mobile device receives user input indicative of a first authentication factor associated with an ownership token bound to a discrete electronic device. Responsive to detecting the discrete electronic device in close proximity, the mobile device may obtain a second authentication factor and a discrete electronic device identifier from the discrete electronic device and provide, to a server communicatively coupled to an ownership token database, credentials to authenticate the mobile device. The mobile device may then receive the ownership token from the server. The mobile device may authenticate itself to the server via an application programming interface (API) exposed by the server. The app may be configured for one-time access to the ownership token server via the API. In such embodiments, access requests received from the app after the ownership token has been transferred to the mobile device are denied. The discrete electronic device may comprise an IoT device that supports wireless, near field communication.

Technical advantages of the present disclosure may be readily apparent to one skilled in the art from the figures, description, and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features. All drawing figures not expressly identified as prior art encompass and accord with one or more embodiments of inventions disclosed herein.

DETAILED DESCRIPTION

Preferred embodiments and their advantages are best understood by reference to the following FIGUREs, wherein like numbers are used to indicate like and corresponding elements or operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a laptop or desktop personal computer, a mobile device including a tablet device or smart phone, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

For purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For purposes of this disclosure, information handling systems include IoT devices and edge gateway devices.

Figure 1:
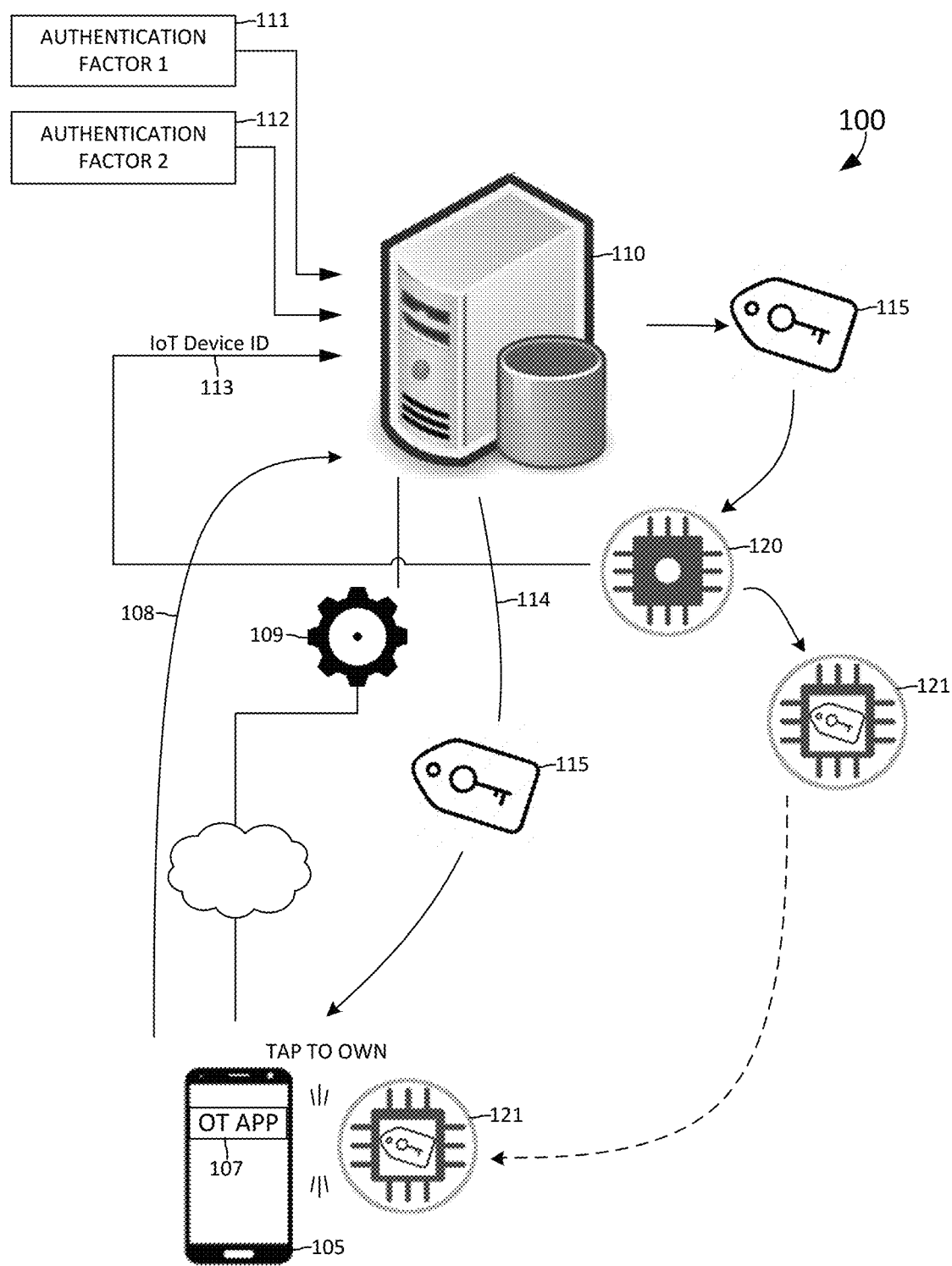
FIG. 1 illustrates a block diagram of a platform for associating an ownership token with a discrete electronic device and transferring the token to a subsequent owner of the device.

FIG. 1 illustrates a block diagram of selected elements of a platform 100 suitable for creating and binding an ownership token 115 to an IoT device 120 or another suitable discrete electronic device. The ownership token 115 may be established in the factory by the IoT device's manufacturer and may function as a default access credential that prevents unauthorized access. In contrast to the manner in which default passwords are frequently implemented on commercially distributed IoT devices including, as examples, home routers and network aware digital cameras, each ownership token is globally unique and highly immune to guessing.

The platform 100 illustrated in FIG. 1 includes an ownership token server 110, a mobile device 105, and a discrete electronic device referred to herein as IoT device 120. Ownership token server 110, which may represent a server or other IT resource of the manufacturer of IoT device 120, may be configured to create and bind an ownership token 115 to IoT device 120 resulting in a secured IoT device 121. The ownership token 115 may enable or otherwise be used in conjunction with an access control mechanism of secured IoT device 121 to prevent unauthorized users from gaining access to secured IoT device 121, its configuration settings, and its I/O and communication resources.

In at least one embodiment, ownership token 115 is bound to IoT device 120 in the factory by the manufacturer so that access control mechanisms associated with ownership token 115 are enabled before the IoT device is sold or otherwise distributed. In this respect, ownership token 115 supports a function analogous to the function provided by default access credentials used in many widely distributed electronic devices. Unlike the default access credentials used in such devices, however, each ownership token 115 is globally unique and highly immune to malicious access control techniques that gain unauthorized access to devices simply by enumerating or otherwise guessing a relatively small number of commonly encountered default credentials. Anecdotal evidence suggests that at least some recent and disruptive DDOS attacks were implemented with techniques that used as few as 60 commonly encountered or widely used userID and password combinations.

Ownership tokens 115 may be securely collected and wrapped on the mobile device 105 and then optionally stored in the cloud or data center (not depicted) as opaque blobs. The ownership token may be used as shared secret for attesting ownership and other trust operations. Once system is delivered to end customer, all device ownerships are transferred from a systems integrator, manufacturer, etc.

FIG. 1 illustrates aspects of ownership token management graphically. As depicted in FIG. 1, first and second authentication factors 111 and 112 are provided to ownership token server 110 along with an IoT device identifier (deviceID) 113, which may be a universally unique serial number or another similarly unique identifier of IoT device 120. Ownership token server 110 generates an ownership token 115 that is bound to IoT device 120 to create secured IoT device 121. Secured IoT device 121 is purchased by a system integrator or other party referred to herein generically as the buyer. The buyer downloads or installs an ownership token app 107 from the manufacturer or another source. Ownership token app 107 may be configured to provide the mobile device 105 with one-time access to ownership token server 110 via trust API 109. The buyer may then cause mobile device 105 to execute ownership token app 107. Ownership token app 107 may prompt the buyer to enter or otherwise indicate one of the authentication factors, e.g., first authentication factor 111 and the buyer may respond by entering or otherwise indicating the appropriate authentication factor. Mobile device 105 is now ready to tap secured IoT device 121. Ownership token app 107 may respond to detecting such a tap by communicating with secured IoT device 121 to acquire second authentication factor 112 and IoT deviceID 113 from secured IoT device 121 via near field communication or another suitable wireless protocol. Ownership token app 107 may now send a request 108 to ownership token server 110 via trust API 109 and provide first authentication factor 111, second authentication factor 112, and IoT deviceID 113 as credentials enabling ownership token server 110 to authenticate the request. Upon authenticating the request and establishing a trusted connection 114 with mobile device 105, ownership token server 110 may then send, or cause another resource to send, ownership token 115 to mobile device 105. In at least one embodiment, ownership token app 107 is configured as a one-time access app that, upon detecting successful receipt of ownership token 115 by mobile device 105, is thereafter unable to establish a connection with ownership token server 107 via API 109.

Figure 2:
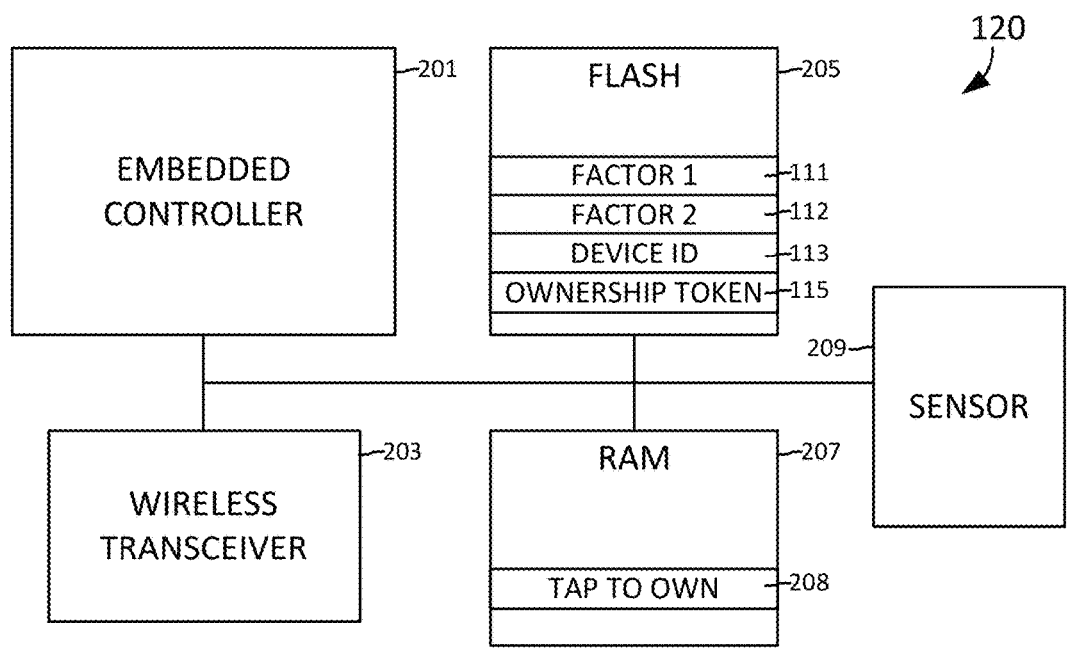
FIG. 2 illustrates a block diagram of selected elements a token server suitable for use in the platform of FIG. 1.

Referring to FIG. 2, selected elements of IoT device 120 are illustrated. The IoT device 120 illustrated in FIG. 2 includes an embedded controller 201, a wireless transceiver 203, flash or other suitable nonvolatile memory 205, some random access memory 207, and a sensor 209, which may be substantially any kind of sensor capable of inclusion within the form factor of IoT device 120. Other embodiments of IoT device 120 may include more, fewer, or different resources. In at least one embodiment, IoT device 120 may represent a home router, network-aware security camera, or any other type of IoT device that has been targeted by hackers in the past.

The flash 205 illustrated in FIG. 2 includes first authentication factor 111, second authentication factor 112, and IoT deviceID 113. Although these data items are shown as being stored within flash 205, each may be stored or otherwise indicated in a register or other resource of IoT device 120. IoT device 120 may also store a copy of the ownership token 115 in flash 205 or within a secure storage device not depicted in FIG. 2.

Flash 205 and RAM 207 may also include instructions, executable by embedded controller 201 and such instructions, when executed, may cause embedded controller 201 to perform operations in accordance with the instructions. In this manner, IoT device 120 may be configured to perform particular functions.

The RAM 207 illustrated in FIG. 2 includes tap to own instructions 208. In at least one embodiment, tap to own instructions 208 may be triggered by an indication, received from embedded controller 201 or wireless transceiver 203, of another device in close proximity to IoT device 120 communicating with IoT device 120 via wireless transceiver 203. Tap to own instructions 208, when executed, may cause IoT device 120 to monitor for input from the nearby device and compare any such input received to one of the authentication factors, e.g., first authentication factor 111. If IoT device 120 receives input from the nearby device and determines that the input matches or is otherwise indicative of the appropriate authentication factor, tap to own instructions 208 may cause IoT device 120 to transmit the other authentication factor, e.g., second authentication factor 112, and IoT deviceID 113 back to the nearby device.

Figure 3:
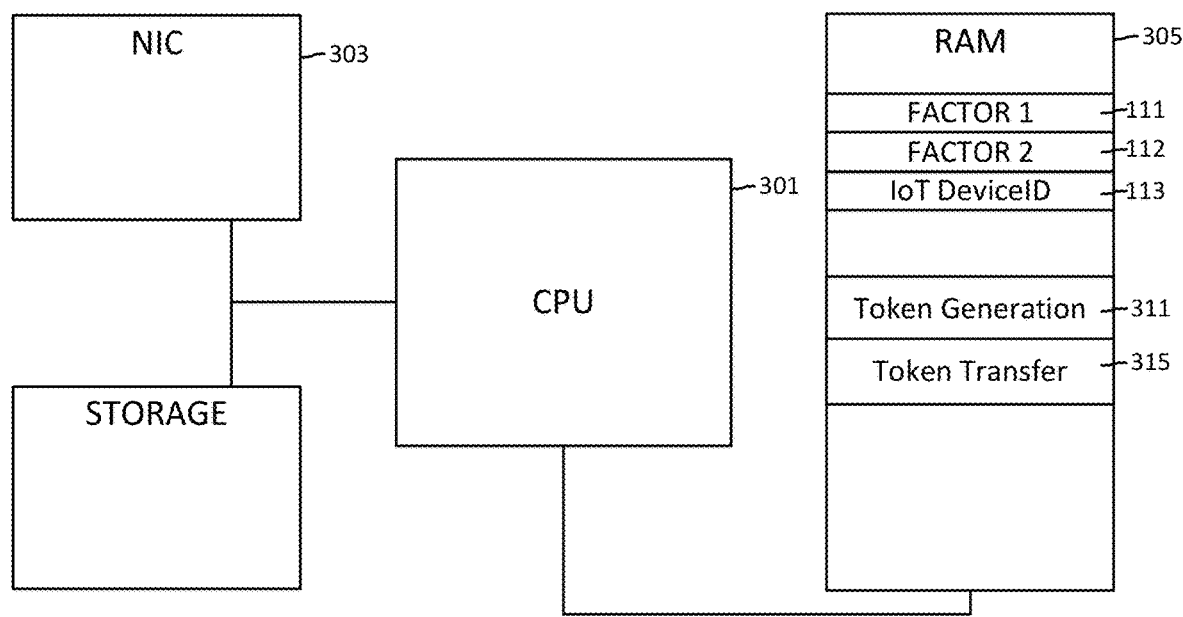
FIG. 3 illustrates a block diagram of selected elements of a mobile device suitable for use in the platform of FIG. 1.

Referring now to FIG. 3, elements of the ownership token server 110 are illustrated. The ownership token server 110 illustrated in FIG. 3 includes a central processing unit 301 communicatively coupled to a network interface controller (NIC) 303, and a system memory or RAM 305. The RAM 305 illustrated in FIG. 3 includes processor executable program instructions including token generation instructions 311 and token transfer instructions 315. Token generation instructions 311 may include instructions that, when executed by CPU 301, result in the generation of an ownership token, such as the ownership token 115 of FIG. 1, for a particular device, such as the IoT device 120 of FIG. 1. In at least one embodiment, token generation instructions 311 may obtain two or more authentication factors, including first authentication factor 111 and second authentication factor 112, as well as an IoT device-specific factor such as IoT deviceID 113. In such embodiments, ownership token server 110 may calculate or derive the ownership token in accordance with the authentication factors, the IoT device-specific factor, and any one or more suitable additional factors using any of a plurality of suitable token generation algorithms.

Token transfer instructions 315 may enable ownership token server 110 to authenticate a mobile device attempting to communicate with ownership token server 110 via an API 109 (not depicted in FIG. 3). Token transfer instructions 315 may cause ownership token server 110, after authenticating the mobile device, to send, or cause another information handling resource to send, ownership token 115 to the mobile device.

Figure 4:
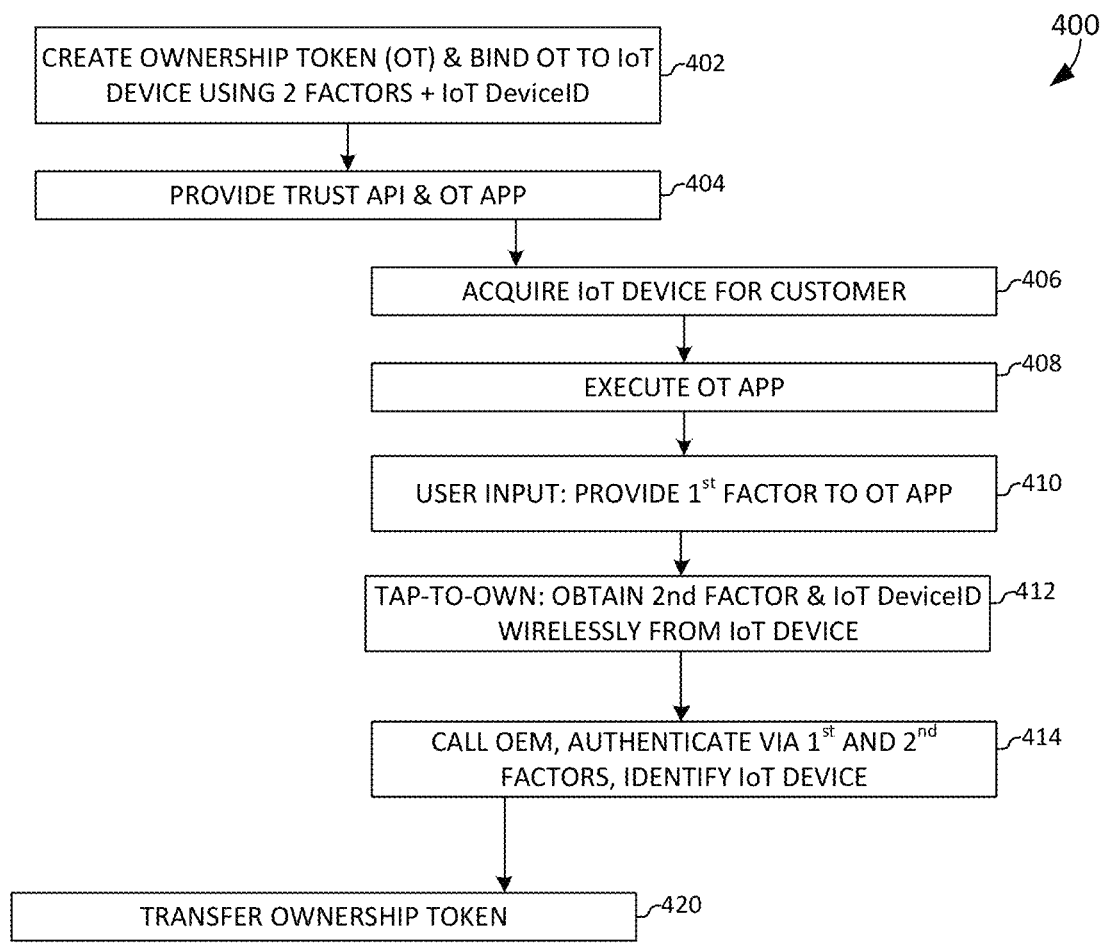
FIG. 4 illustrates a flow diagram of a method of binding a securely transferrable ownership token to a discrete electronic device.

Referring now to FIG. 4, a flow diagram illustrates a method 400 for establishing and managing a securely transferrable ownership token, such as the ownership token 115, associated with an IoT device such as IoT device 120. In the method 400 illustrated in FIG. 4, the IoT device manufacturer establishes (operation 402) a trust binding between itself and the IoT device in the factory. The manufacturer may also provide (operation 404) a trust API and an ownership token app that may downloaded to a mobile device of a buyer of secured IoT device 121 or a subsequent party in the IoT chain of title. For example, the IoT device may be first acquired from the manufacturer by a systems integrator, who may have acquired the device on behalf of another party to whom the systems integrator may ultimately deliver the IoT device. In this example, the systems integrator acquires (operation 406) the IoT device from the manufacturer and downloads the ownership token app. The systems integrator may then execute (operation 408) the ownership token app provided by the manufacturer, a software development partner of the manufacturer, or another source, on a mobile device. The systems integrator may then enter (operation 410) one of the authentication factors, e.g., the first authentication factor, into the mobile app. In one embodiment, the manufacturer uses a manufacturer identifier as one of the authentication factors that produce the ownership token binding. This identifier may be provided to the systems integrator as part of the IoT sale transaction.

Entering the authentication factor that was previously provided to the systems integration into the mobile app configures the mobile device to participate in a near field communication transfer of information from the IoT device to the mobile app. This transaction is referred to herein as a tap-to-own transaction because the near field communication may be triggered by lightly tapping together the two applicable devices. Accordingly, the method 400 illustrated in FIG. 4 includes tap-to-own operation 412 in which the IoT device transfers the second authentication factor and the IoT device identifier, encrypted or otherwise, to the mobile application via a near field communication signal when the mobile app and IoT device are tapped together or otherwise brought within a near field communication proximity of each other. Near field communication proximity may refer to a proximity of approximately 4 to 5 centimeters consistent with the intended range of near field communication signals.

Because the mobile app has both authentication factors as well as the IoT device identifier following successful completion of the near field transaction, the mobile device may initiate communication (operation 414) with the manufacturer and use the authentication factors and IoT device identifier as credentials to authenticate the request.

In at least one embodiment, the API available to the systems integrator for establishing a communication path to transfer the ownership token may be implemented as a single use API that becomes unavailable to the systems integrator as well as others after the successful transfer of the ownership token. As illustrated in FIG. 4, the manufacturer responds to a properly authenticated request from the systems integrator by transferring the ownership token to the systems integrator in operation 420.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A mobile device, comprising:
   a central processing unit (CPU);
   a mobile communication module; and
   a non-transitory computer readable medium, comprising processor executable program instructions for an ownership token application that, when executed, causes the CPU to perform operations comprising:
   responsive to receiving user input indicative of a first authentication factor associated with an ownership token bound to an Internet of Things (IoT) device, configuring the mobile device to participate in a wireless, near field transfer of authentication data from the IoT device to the mobile device;
   responding to a trigger event by receiving, from the IoT device, additional authentication data associated with the ownership token, wherein the trigger event occurs when the mobile device and the IoT device are brought into close proximity and wherein the additional authentication information includes a second authentication factor and an IoT identifier associated with the ownership token;
   providing, to a server communicatively coupled to an ownership token database, authentication credentials to authenticate the mobile device to the server, wherein the authentication credentials include the first authentication factor, the second authentication factor, and the IoT identifier; and
   receiving the ownership token from the server.

2. The mobile device of claim 1, wherein the providing of authentication credentials to authenticate the mobile device comprises establishing communication with the server via an application programming interface (API) exposed to the mobile device by the server.

3. The mobile device of claim 2, wherein the API is unavailable to the ownership token application after the mobile device receives the ownership token.

4. The mobile device of claim 1, wherein the IoT device comprises: an embedded controller, a wireless transceiver, and non-volatile storage sufficient to store the IoT identifier.

5. The mobile device of claim 4, wherein the wireless transceiver comprises a near field communication transceiver.

6. The mobile device of claim 1, wherein the ownership token enables the mobile device to gain access to configuration settings, communication resources, and input/output (I/O) ports of the IoT device.

7. A method, comprising:
responsive to receiving, by an ownership token application program of a mobile device, user input indicative of a first authentication factor associated with an ownership token bound to an Internet of Things (IoT) device, configuring the mobile device to participate in a wireless, near field transfer of authentication data from the IoT device to the mobile device;
responding to a trigger event by receiving, from the IoT device, additional authentication data associated with the ownership token, wherein the trigger event occurs when the mobile device and the IoT device are brought into close proximity and wherein the additional authentication data includes a second authentication factor and an IoT identifier associated with the device ownership token;
providing, to a server communicatively coupled to an ownership token database, authentication credentials to authenticate the mobile device to the server, wherein the authentication credentials include the first authentication factor, the second authentication factor, and the IoT identifier; and
receiving the ownership token from the server.

8. The method of claim 7, wherein the providing of authentication credentials to authenticate the mobile device comprises establishing communication with the server via an application programming interface (API) exposed to the mobile device by the server.

9. The method of claim 8, wherein the API is unavailable to the mobile device after the mobile device receives the ownership token.

10. The method of claim 7, wherein the IoT device includes: an embedded controller, a wireless transceiver, and non-volatile storage sufficient to store a device identifier.

11. The method of claim 10, wherein the wireless transceiver comprises a near field communication transceiver.

12. The method of claim 7, wherein the IoT device comprises a device selected from: a home router and a digital camera.

13. The method of claim 7, wherein the ownership token enables the mobile device to gain access to configuration settings, communication resources, and I/O ports of the IoT device.

14. A non-transitory computer readable medium, including processor executable program instructions, wherein the instructions, when executed, cause a processor to perform operations, wherein the operations comprise:
responsive to receiving, from a mobile device, user input indicative of a first authentication factor associated with an ownership token bound to an Internet of Things (IoT) device, configuring the mobile device to participate in a wireless, near field transfer of additional authentication data from the IoT device to the mobile device;
responding to a trigger event by receiving, from the IoT device, the additional authentication data, wherein the trigger event occurs when the mobile device and the IoT device brought into close proximity and wherein the additional authentication data includes a second authentication factor and an IoT identifier associated with the ownership token;
providing, to a server communicatively coupled to an ownership token database, authentication credentials to authenticate the mobile device to the server, wherein the authentication credentials include the first authentication factor, the second authentication factor, and the IoT identifier; and
receiving the ownership token from the server.

15. The non-transitory computer readable medium of claim 14, wherein the providing of authentication credentials to authenticate the mobile device comprises establishing communication with the server via an application programming interface (API) exposed to the mobile device by the server.

16. The non-transitory computer readable medium of claim 15, wherein the API comprises a single use API, wherein the single use API becomes unavailable to the mobile device after the ownership token is successfully transferred to the mobile device.

17. The non-transitory computer readable medium of claim 14, wherein the IoT device comprises: an embedded controller, a wireless transceiver, and non-volatile storage sufficient to store the IoT identifier and wherein the wireless transceiver comprises a near field communication transceiver.

18. The non-transitory computer readable medium of claim 14, wherein the ownership token enables the mobile device to gain access to configuration settings, communication resources, and input/output (I/O) ports of the IoT device.

19. The non-transitory computer readable medium of claim 14, wherein the trigger event occurs when the mobile device is tapped against the IoT device.

20. The non-transitory computer readable medium of claim 14, wherein the trigger event occurs when the mobile device is brought into near field proximity with to the IoT device.

* * * * *

UNITED STATES PATENT AND TRADEMARK OFFICE
CERTIFICATE OF CORRECTION

PATENT NO. : 10,645,557 B2
APPLICATION NO. : 15/479125
DATED : May 5, 2020
INVENTOR(S) : Robison et al.

Page 1 of 1

It is certified that error appears in the above-identified patent and that said Letters Patent is hereby corrected as shown below:

In the Claims

Claim 7, Column 9, Lines 17-18, change "device ownership token" to --ownership token--.

Signed and Sealed this
Ninth Day of June, 2020

Andrei Iancu
*Director of the United States Patent and Trademark Office*